(12) United States Patent
Tice et al.

(10) Patent No.: US 7,495,573 B2
(45) Date of Patent: Feb. 24, 2009

(54) CAMERA VISION FIRE DETECTOR AND SYSTEM

(75) Inventors: Lee D. Tice, Bartlett, IL (US); Dragan P. Petrovic, Geneva, IL (US)

(73) Assignee: Honeywell International Inc., Morristown, NJ (US)

( * ) Notice: Subject to any disclaimer, the term of this patent is extended or adjusted under 35 U.S.C. 154(b) by 372 days.

(21) Appl. No.: 11/062,184

(22) Filed: Feb. 18, 2005

(65) Prior Publication Data

US 2006/0188113 A1 Aug. 24, 2006

(51) Int. Cl.
*G08B 17/10* (2006.01)

(52) U.S. Cl. .................. 340/630; 340/628; 348/143; 382/103

(58) Field of Classification Search .......... 340/628, 340/630; 381/181; 348/135, 143; 382/103
See application file for complete search history.

(56) References Cited

U.S. PATENT DOCUMENTS

| 5,153,722 | A | 10/1992 | Goedeke et al. ............. 358/108 |
| 5,253,070 | A | 10/1993 | Hong ......................... 358/209 |
| 5,289,275 | A | 2/1994 | Ishii et al. .................... 348/154 |
| 5,677,532 | A | 10/1997 | Duncan et al. ............. 250/339 |
| 5,926,280 | A | 7/1999 | Yamagishi et al. .......... 356/390 |
| 5,980,123 | A * | 11/1999 | Heifler ....................... 396/427 |
| 6,271,758 | B1 * | 8/2001 | Nakamura et al. .......... 340/630 |
| 6,289,331 | B1 | 9/2001 | Pedersen et al. ............. 706/60 |
| 6,556,981 | B2 | 4/2003 | Pedersen et al. ............. 706/44 |
| 6,611,207 | B1 * | 8/2003 | Yuan et al. ................... 340/630 |
| 6,828,913 | B2 * | 12/2004 | Oppelt et al. ................ 340/630 |
| 6,844,818 | B2 * | 1/2005 | Grech-Cini ................. 340/628 |
| 7,176,440 | B2 * | 2/2007 | Cofer et al. .................. 250/221 |
| 7,287,884 | B2 * | 10/2007 | Koike ......................... 362/464 |
| 2002/0135490 | A1 * | 9/2002 | Opitz et al. .................. 340/628 |
| 2005/0100193 | A1 * | 5/2005 | Privalov ..................... 382/103 |
| 2005/0156737 | A1 * | 7/2005 | Al-Khateeb ................. 340/541 |
| 2006/0202847 | A1 * | 9/2006 | Oppelt et al. ................ 340/630 |
| 2007/0222588 | A1 * | 9/2007 | Wolfe .................... 340/539.13 |

OTHER PUBLICATIONS

Thomas G. Cleary, "Video Detection and Monitoring of Smoke Conditions", National Institute of Standards and Technology, Building and Fire Research Laboratory, Gaithersburg, MD 20899 U.S.A., published on or before Dec. 31, 2002, 10 pages.

* cited by examiner

*Primary Examiner*—Benjamin C Lee
*Assistant Examiner*—Hoi C Lau
(74) *Attorney, Agent, or Firm*—Husch Blackwell Sanders Welsh & Katz

(57) ABSTRACT

Wide area camera vision systems can respond to variations in light beams projected into a region being monitored. The variations are indicative of the presence of smoke in the region. In addition to providing viewable images of the region being monitored, analysis software can be used to evaluate the extent of smoke in the region or regions being monitored.

29 Claims, 2 Drawing Sheets

CAMERA VISION FIRE DETECTOR AND SYSTEM

FIELD OF THE INVENTION

The invention pertains to fire detection systems based upon camera vision. More particularly, the invention pertains to such systems which incorporate a predetermined beam of radiant energy into a region to be monitored for purposes of accurately determining the presence of smoke.

BACKGROUND OF THE INVENTION

A variety of different fire detection systems are known which utilize camera vision for purposes of monitoring the region. Signals from the camera or cameras in known systems, can be processed to evaluate flames within the field of view of the cameras.

Many of the known systems have a significant problem detecting smoke at night. They require that the lights in the region being monitored remain ON or that accessory lighting be provided in the area so the camera can detect changes. The primary problem with this is that a fire detecting system must have an ability to operate normally in the absence of power in the building. Therefore, at least some of the lighting would need to have battery back-up. The high power lighting of an area being monitored can make the battery back-up expensive. These systems often do not work well at night for detecting smoke in the absence of supplemental illumination. Flames can be detected at any time of day/night. Smoldering fires, however, are not readily detected in the absence of supplemental lighting which requires battery backup. Hence, these systems may not pass agency approvals as smoke detection systems.

Alternately, projected beam of smoke detectors are known. In these detectors, a beam of light is projected through an area being monitored. Exit beam characteristics are evaluated for the presence of smoke. While projected beam smoke detectors are useful and effective for their intended purpose, they represent an expense which is directed to implementing a single purpose function, namely smoke detection.

There continues to be a need for systems that are able to provide a fire detection function in combination with cameras which can also be used for security monitoring of an area or region. Such multi-purpose systems should be more cost effective than two separate systems. Additionally, such integrated systems may provide opportunities to cost effectively detect smoke under decreased lighting conditions or in dark regions.

DETAILED DESCRIPTION OF THE EMBODIMENTS

Figure 1:
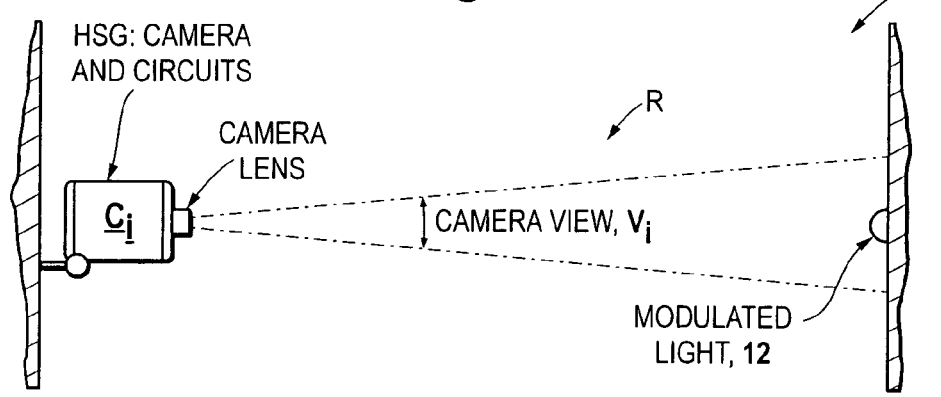
FIG. 1 illustrates a camera configuration in accordance with the invention.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

System which embody the invention incorporate a modulatable source of radiant energy, visible or infra-red light. The radiant energy can be detected by a camera(s) that can also provide a security function. Use of the modulatable source enables such systems to detect smoke day or night.

Low power modulated sources can be used as they do not provide an over-all illuminating function. Only a relatively small portion of a region being monitored needs to be illuminated. Camera(s) local to a beam or beams from the source sense(s) the beam(s). Outputs from the camera(s) can be monitored for changes over time which may be indicative of smoke.

The camera responds to a beam from the modulated light source. A control system can, for example, monitor camera outputs for changes over time that may be indicative of a smoke condition. For example in a dark region (at night) the beam(s) noted above can be used for detection of smoke. Should a flaming fire break out it will provide an alternate source of illumination in the region and in the field(s) of view of the camera(s) which can be analyzed for indicia of a fire.

The alarm system can also energize local lighting to provide illuminated field(s) of view. Camera signals cannot only be analyzed for the presence of smoke or flame indicia, but images of the illuminated regions can also be viewed by security personnel. Such images could also be transmitted to the local fire department.

In one disclosed system, a camera views a displaced surface that has a modulated light source mounted on it. This light source is low power and provides only enough light to produce a contrast with its surroundings.

In the preferred system, a spatially interrupted pattern of light and dark regions is emitted to provide contrast. This pattern can be as simple as a black center surrounded by a ring of light. Alternately, a more complex pattern can be presented to the camera.

The camera's output signals are processed to determine the presence of a smoke condition. The light only needs to be visible to the camera and therefore may be infrared if the camera is sensitive to infrared. The output signals could also be processed to detect the presence of a flaming fire.

In another disclosed system, a camera views illumination of a displaced surface that has a light image projected onto it. This light image can be just a spot or a pattern of light.

In a disclosed embodiment, the light source can be implemented as a laser that projects a beam onto a displaced surface. The resulting illumination of the surface is captured by the camera and processed to determine the existence of a smoke condition. An advantage of this type of system is that the laser can be directly mounted to the camera such that small changes in angle of the camera will be followed with the laser and the illuminated image will not change relative to the camera view.

In another disclosed system, a camera views a displaced surface with the light source also located near that surface. The light is not projected across the sensing region. Hence, it can be projected with more complex patterns.

Alternately, the light source can just illuminate a pattern already existing on the illuminated surface. Such a pattern can be a black center circle surrounded by a white ring. The white ring is illuminated and provides a contrast with the black center that is visible both day and night.

In the above described embodiments, the camera sends the picture information to a processor. The process executes locally available software to evaluate the picture information for the presence of smoke.

In yet another embodiment of the invention, a light source projects a beam of light from a displaced location towards a camera. The camera can monitor the light source so the system can determine that the source is operational at all times. In addition, smoke in the region will cause the beam of light to illuminate.

The camera views a change in illumination which will appear as a line if the light source is a laser. If an infrared source is used, then this beam of light will not be detectable to persons in the area.

The camera sends the picture information to a processor for evaluation: The processor software will determine changes in the picture frames received and determine if there is a smoke condition or not. This processing can include digital signal processing.

In the above described embodiment, the processor is looking for a illuminated line to form in the picture frames. This illuminated line is modulated to identify it with a fire system. When the line appears, it indicates that there is smoke in the region that is scattering light from the light beam (laser beam) causing it to become visible to the camera.

The processor can further analyze characteristics of the illuminated beam in determining a smoke condition. These characteristics can include, variations in intensity, changes in line length, uneven light intensity along the line, frequency, and time.

In yet another aspect of the invention, a processor aligns a center of a picture to an illuminated target. Portions of the illuminated target may be black. A change in in blackness to gray or the illuminated color or illuminated intensity can be detected. Smoke in the region will cause diffusion of light from the illuminated target so that the camera will not see the picture as clearly nor will it appear as black as when there is no smoke present.

Black colors at the target can be important because they will appear black for both day and night conditions. The light to black contrast can also be an important monitoring portion of the smoke detector. In addition, if there is other ambient lighting present, the change in contrast becomes even more severe with smoke. The system can be equipped to make adjustments for ambient light levels in determining the source of an alarm condition.

Ambient light will diffuse in the smoke. Hence, a region in the target will change more with the level of smoke than if ambient light is not present. Compensation can be incorporated to maintain a similar smoke sensing level for both light and dark conditions in the region.

FIG. 1 illustrates an exemplary camera configuration 10 in accordance with the invention. A camera Ci is illustrated therein with a field of view Vi which extends across a portion of a region R being monitored. A modulated light source 12 is mounted within the view Vi of the camera Ci. Source 12 could be spatially, temporally or frequency modulated all without limitation. In a preferred system, the light source 12 emits a pattern having light and dark regions (light and blocked light) such that viewing the light source provides light contrast. This pattern can be as simple as a black center surrounded by a ring of light. Alternately, it can have a detailed pattern that is viewed by the camera. As discussed in more detail subsequently, the camera Ci transmits image information, via a wired or wireless medium to a smoke or flame detection system for analysis.

Figure 1A:
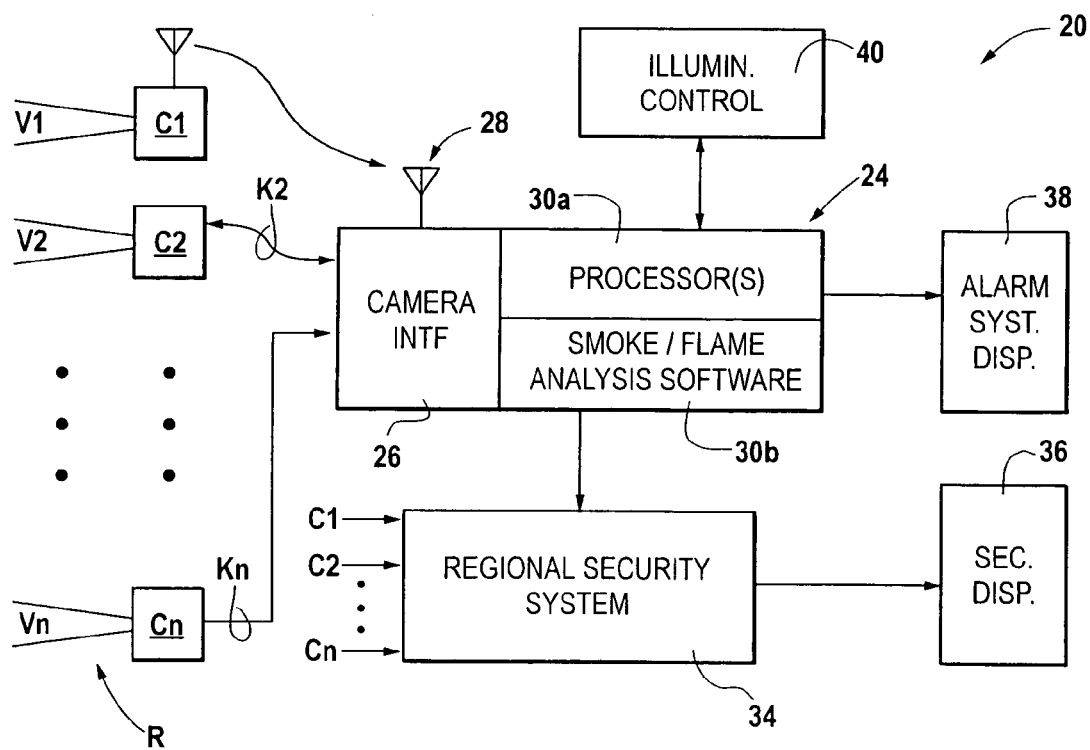
FIG. 1A is a block diagram of a smoke/flame regional monitoring system in accordance with the invention.

FIG. 1A is a block diagram of an analysis system 20 in accordance with the invention. As illustrated in FIG. 1A, a plurality of cameras C1, C2 . . . Cn can be mounted within a region R being monitored. The cameras each have a respective field of view V1, V2 . . . Vn in a region or regions R being monitored. It will be understood that the fields of view for the respective cameras can but need not overlap one another.

The cameras C1, C2 . . . Cn, which could be implemented as video cameras of various technologies are coupled wirelessly or via cables to a smoke/flame regional monitoring system indicated generally at 24. The system 24 includes a camera interface 26.

The interface 26 can incorporate one or more wireless communication antennas 28 for the receipt of wireless signals from one or more of the cameras Ci. Additionally, the interface 26 can incorporate circuitry for receiving, for example, video signals via hardwired cables K2 . . . Kn all without limitation.

The system 24 also incorporates one or more programmable processors 30a which operate under the control of smoke/flame analysis software 30b. As noted above, the video signals received from a camera such as Ci of FIG. 1, carry information pertaining to the modulated light source 12.

The images from the camera Ci can be analyzed by the analysis software 30b as would be understood by those of skill in the art to determine if the changes present in the light from the modulated source 12 are indicative of the presence of smoke. In such event, the software 30b can communicate alarm indicating indicia to a regional security system 34 which would be monitored by security personnel.

The cameras C1, C2 . . . Cn as would be understood by those of skill in the art, are also coupled to the security system 34. Camera images can be presented to an operator via security display 36. Additionally, system 24 can forward alarm indicating indicia to an alarm system display 38. Finally, a processor 30a can be coupled to a regional illumination control system 40.

In response to a determination of the presence of smoke or flame, the system 24 can signal the illumination control system 40 to illuminate some or all of the region R such as with cameras C1, C2 . . . Cn can present illuminated images to the security personnel via display 36. Additionally, software 30b can continue analyzing the regional image information from various of the video cameras C1, C2 . . . Cn taking into account the presence of a higher degree of illumination in the region R.

Figure 2:
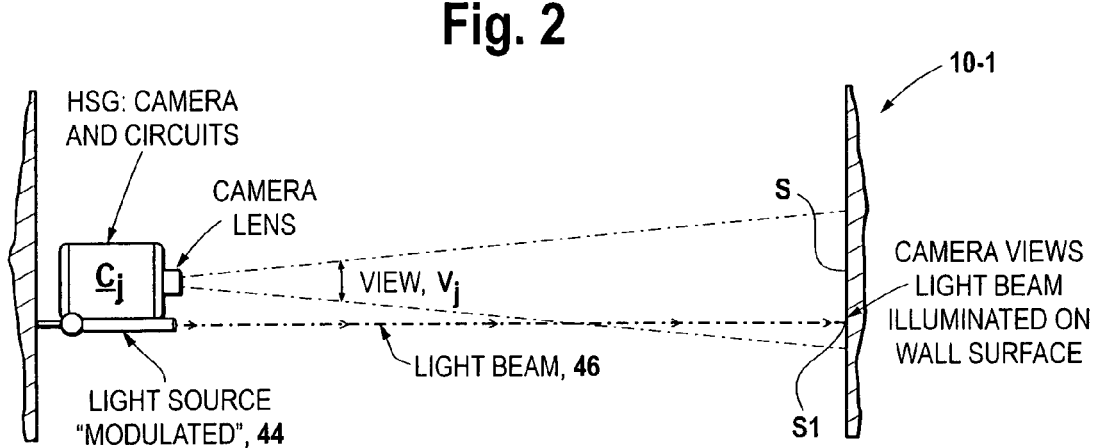
FIG. 2 illustrates an alternate camera configuration in accordance with the invention.
Figure 3:
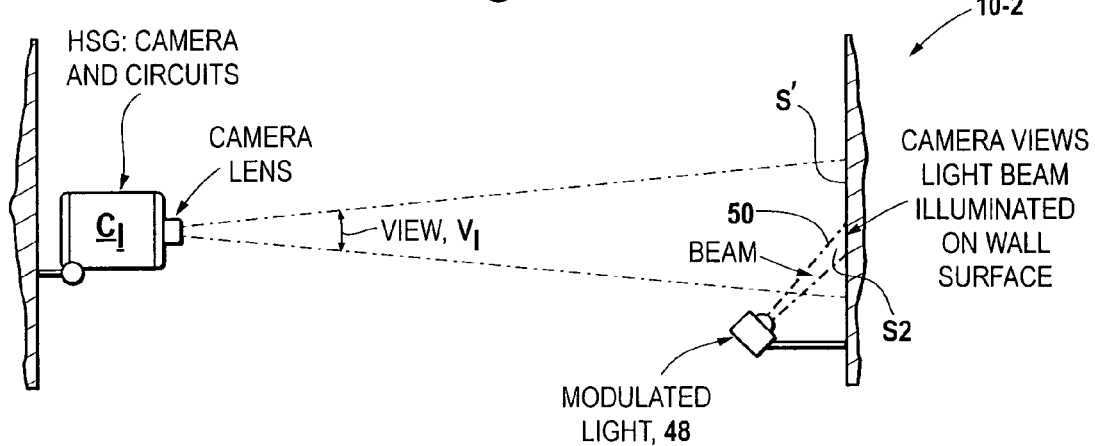
FIG. 3 illustrates another alternate camera configuration in accordance with the invention.
Figure 4:
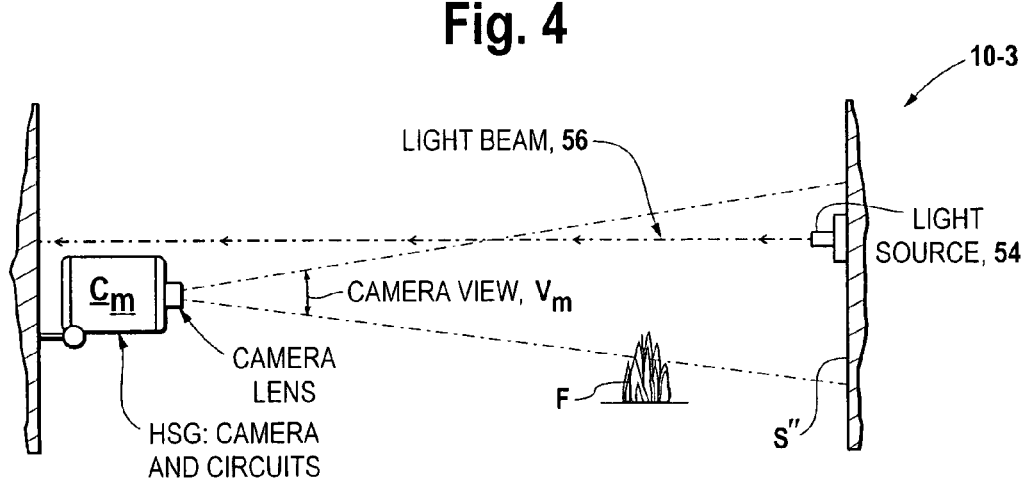
FIG. 4 illustrates a further camera configuration in accordance with the invention.

FIGS. 2-4 illustrate alternate camera/source configurations usable with the system 20.

FIG. 2 illustrates a configuration 10-1 where a camera Cj has a field of view Vj which includes a section S of a wall or other surface. A modulated light source 44 is coupled to a housing for the camera Cj.

The modulated source 44 projects a beam of visible or infrared light 46 onto a portion S1 of section S in the field of view Vj. The image on portion S1 could be part of the incident beam, or, it could be a light pattern. The camera Cj can in turn transmit images of the illuminated portion S1 wirelessly or via cable Kj to system 24. Variations in the illuminated images on S1 when analyzed by software 30b can provide indicia indicative of the presence of smoke in the field of view Vj.

The configuration 10-1 has the advantage that the source 44 is directly coupled to the camera Cj. Hence, possibilities of misalignments between the field of view Vj and the location of incidence S1 of the beam can be minimized.

FIG. 3 illustrates an alternate camera/source configuration 10-2. In FIG. 3, camera C1 has a field of view V1 directed toward a portion S' of a wall or surface. A modulated light source 48 projects a beam 50 onto a location S2 within the field of view V1. The light source 48 can for example, illuminate a pattern already existing on the illuminated surface. Such a pattern could have a black center circle surrounded by a white ring. The white ring is illuminated and provides a contrast with the black center that is visible both day and night.

The camera C1 can in turn transmit images to system 24 of the characteristics of the illumination S2. Software 30b can in turn analyze one or more of such images to establish the presence of a predetermined degree of smoke in the field of view V1.

FIG. 4 illustrates another camera configuration 10-3 in accordance with the invention. A camera Cm has a field of view Vm and is coupled to transmit images wirelessly or via a wired medium, such as Km to system 24. The field of view Vm is directed toward and intersects a portion S" of a wall or surface.

A light source 54 which is located within the field of view Vm projects a beam 56 generally towards the camera Cm through the field of view Vm. Images from the camera Cm of the beam 56 will vary in accordance with the presence of smoke in the respective field of view Vm.

One of the advantages of system 10-3 is that the camera can monitor the light source to be sure it is operational at all times. In addition, smoke in the region will cause the beam of light to illuminate. The camera Cm can detect this change in illumination which will appear as a line if the light source 54 is a laser. If an infrared source is used, the beam of light 56 will not be visible by persons in the area. Processing can be carried out via software 30b to determine the presence of smoke in the region Vm as a result of changes in visibility of light beam 56.

In summary, in FIG. 4, the processor 30a can detect an illuminated line that has appeared in the picture frames. This illuminated line is modulated to associate it with a fire system. When the line appears, it indicates that there is smoke in the region that is scattering light from the light beam (laser beam) causing it to become visible to the camera Cm.

The processor 30a can analyze characteristics of the illuminated beam in determining a smoke condition. These characteristics can include, variations in intensity, changes in line length, uneven light through the line, projection of intersection of the line with the coordinates of the light source, etc. These characteristics can further include intensity, frequency and time.

It will be understood that the camera configurations 10, 10-1 . . . 10-3 are exemplary only and other configurations come within the spirit and scope of the present invention. Further, it will be understood that all such configurations in combination with analysis software 30b can respond to the presence of flames F, best seen in FIG. 4, which might be present in the respective field of view Vm.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An apparatus comprising:
at least one source of radiant energy of a predetermined frequency, the source emits a spatially modulated beam at the predetermined frequency;
an optical-to-electrical transducer with a two dimensional radiant energy input port for receiving radiant energy from the beam, the transducer comprises a camera with a field of view;
control circuitry coupled to the transducer, the control circuitry evaluates electrical signals from the transducer relating to at least one pre-stored representation to establish the presence of an alarm condition; and
which includes smoke detection software, the software analyzes characteristics of the modulated beam within the field of view.

2. An apparatus as in claim 1 where the camera provides an output comprising a human viewable image of a region within the field of view.

3. An apparatus as in claim 2 which includes software, the software, at least in part, establishes the presence of the alarm condition.

4. An apparatus as in claim 1 further comprising a planar surface fixed relative the source, the field of view of the camera including at least a part of the fixed surface.

5. An apparatus comprising:
at least one source of radiant energy of a predetermined frequency, the source projects a beam at the predetermined frequency;
an optical-to-electrical transducer with a two dimensional radiant energy input port for receiving radiant energy from the beam, the transducer comprises a camera with a field of view;
control circuitry coupled to the transducer, the control circuitry evaluates electrical signals form the transducer relating to at least one pre-stored representation to establish the presence of an alarm condition and which includes a surface on which the beam impinges, at least in part, to spatially modulate the beam with the surface, at least in part, within the field of view, the surface having a multi-colored circular pattern, the pattern having a first color that provides a contrast with respect to a second color of the pattern; and
which includes smoke detection software, the software analyzes characteristics of the modulated beam within the viewing region.

6. An apparatus as in claim 5 wherein the surface is planar and fixed relative to source, the field of view of the camera including at least a part of the surface.

7. A system comprising:
a camera with a predetermined field of view and an electrical output indicative of incident radiant energy;
a source of radiant energy with a patterned output beam projected into the field of view;
a monitor for presentation of a visual representation of an image associated with the field of view;
control circuitry coupled at least to the camera, the circuitry responsive to sensed changes in the radiant energy projected into the field of view, determines, at least in part, the existence of a smoke condition in the field of view.

8. A system as in claim 7 which includes smoke related evaluation software.

9. A system as in claim 8 where the evaluation software compares a current light profile to a predetermined smoke profile.

10. A system as in claim 8 where the evaluation software evaluates a rate of change of received light profiles.

11. A system as in claim 7 where the monitor is coupled to the camera by a communications network.

12. A system as in claim 7 with circuitry to adjust an intensity parameter of the beam in accordance with the ambient light level.

13. An apparatus as in claim 7 further comprising a planar surface fixed relative to the source, the field of view of the camera including at least a part of the fixed surface.

14. A system to monitor a space for smoke comprising:
a camera having a viewing region;
a source which emits light in the viewing region of the camera, the emitted light having a predetermined spatial pattern, the emitted light being directed generally towards the camera;
the camera outputs first signals that include information regarding received light from the light source;
a processor that receives the first signals from the camera and analyzes the first signals for changes indicative of presence of smoke, the processor outputs a second signal to an indicator that is at least one of visual, audible or vibration;
where the indicator is activated by the second signal when smoke is present in the monitored space.

15. A system as in claim 14 where a decrease in light from the light source is indicative of presence of smoke.

16. A system as in claim 14 where the camera is sensitive to a frequency of the light emitted from the source.

17. A system as in claim 14 where a decrease in clarity of the image of at least one of the light source or a region surrounding the light source, as represented by the first signal is indicative of smoke.

18. A system as in claim 14 where the pattern is used to determine if the source is functioning properly.

19. A system as in claim 14 where the indicator is displaced from the processor and receives the second signal via a predetermined medium.

20. A system as in claim 19 wherein the medium comprises at least one of a wired or wireless medium.

21. A system as in claim 14 further comprising a planar surface fixed relative to the source, the field of view of the camera including at least a part of the fixed surface.

22. A system to monitor a space for smoke comprising:
a camera;
a light source that emits light onto a displaced planar surface within a viewing region of the camera in a monitored space;
the light source being modulated, such that the intensity of emitted light varies across the surface of the said light source;
the camera outputs first signals that include information regarding received light from the surface;
a processor that receives the first signals from the camera and analyzes the first signals for changes indicative of smoke and outputs a second signal to an indicator that is at least one of visual, audible or vibration;
where the indicator is activated by the second signal when smoke is detected within the monitored space.

23. A system as in claim 22 where the light source includes at least one of an LED, laser, or an incandescent light.

24. A system as in claim 22 where a decrease in received light from the surface is indicative of smoke.

25. A system as in claim 22 wherein the planar surface is fixed relative to the source, the viewing region of the camera including at least part of the surface.

26. A system to monitor a space for a presence of smoke comprising:
a camera having a viewing region;
a source which emits light in the viewing region of the camera and where the emitted light is one of spatially, temporally, or frequency modulated;
the camera outputs first signals that include information regarding light received from the viewing region;
a processor that receives the first signals from the camera and analyzes the first signals for changes indicative of presence of smoke, the processor outputs a second signal to an indicator that is at least one of visual, audible or vibratory;
where the indicator is activated by the second signal when smoke is present in the monitored space; and
which includes control circuitry, coupled to the processor which illuminates at least portions of the viewing region with a higher degree of illumination than provided by the source.

27. A system as in claim 26 which includes at least one visual display unit where illuminated images of the monitored space can be presented.

28. A system as in claim 27 where the first signals include information regarding modulated light received from the viewing region.

29. A system as in claim 26 further comprising a planar surface fixed relative to the source, the viewing region of the camera including at least a part of the fixed surface.

* * * * *